(12) United States Patent
Ivancic et al.

(10) Patent No.: US 8,925,972 B2
(45) Date of Patent: Jan. 6, 2015

(54) IN-LINE PRESSURE BALANCED EXPANSION JOINT FOR PIPING AND DUCTING SYSTEMS WITH CIRCULAR CROSS SECTION AND INTERNALLY LOCATED TIE RODS

(75) Inventors: Zdravko Ivancic, Bregana (HR); Misa Jocic, Baden (CH)

(73) Assignees: Numikon D.O.O. (HR); Pipetech Jocic (CH); Innospin AG (CH)

( * ) Notice: Subject to any disclaimer, the term of this patent is extended or adjusted under 35 U.S.C. 154(b) by 80 days.

(21) Appl. No.: 13/697,735

(22) PCT Filed: May 10, 2011

(86) PCT No.: PCT/HR2011/000017
§ 371 (c)(1),
(2), (4) Date: Jan. 8, 2013

(87) PCT Pub. No.: WO2011/141758
PCT Pub. Date: Nov. 17, 2011

(65) Prior Publication Data
US 2013/0127158 A1    May 23, 2013

(30) Foreign Application Priority Data
May 13, 2010    (HR) .............................. P 20100267 A

(51) Int. Cl.
*F16L 21/00*    (2006.01)
*F16L 51/03*    (2006.01)
(52) U.S. Cl.
CPC ............... *F16L 51/03* (2013.01); *F16L 51/035* (2013.01)
USPC .......................................... 285/227; 285/228
(58) Field of Classification Search
CPC ......... F16L 27/12; F16L 27/11; F16L 27/111; F16L 51/03; F16L 51/035
USPC ................................................. 285/227, 228
See application file for complete search history.

(56) References Cited

U.S. PATENT DOCUMENTS

| | | | |
|---|---|---|---|
| 2,568,923 A | 9/1951 | McNeary | |
| 5,248,170 A | 9/1993 | Francis | |
| 5,299,840 A | 4/1994 | Heye | |
| 5,791,144 A * | 8/1998 | Thompson | 285/228 |

FOREIGN PATENT DOCUMENTS

| | | |
|---|---|---|
| BE | 544576 | 2/1956 |
| CN | 2215063 | 12/1995 |
| FR | 1 146 661 | 11/1957 |
| FR | 1 501 504 | 11/1967 |
| FR | 1 515 641 | 3/1968 |

* cited by examiner

*Primary Examiner* — Aaron Dunwoody
(74) *Attorney, Agent, or Firm* — St. Onge Steward Johnston & Reens LLC

(57) ABSTRACT

In-line pressure balanced expansion joint for thermal expansion compensation of piping and ducting of circular cross section with the tie rods located inside the device consists of one large, central expansion joint and two smaller, mirror-symmetrical, side expansion joints (2a) and (2b). Three expansion joints are made of bellows (3) and (9) and of straight pipe spools and annular plates welded to each other. Tie rods (15a) and (15b) are placed on a circle at equal angular intervals which connect the sides of the expansion joints. The inner surfaces of the sides of the central expansion joint are reinforced with welded rectangular radial ribs and triangular ribs. The compactness and functionality allows expansion joints for all types of piping and ducting and is particularly suitable for making expansion joints for piping and ducting with a diameter greater than 2 meters.

10 Claims, 2 Drawing Sheets

IN-LINE PRESSURE BALANCED EXPANSION JOINT FOR PIPING AND DUCTING SYSTEMS WITH CIRCULAR CROSS SECTION AND INTERNALLY LOCATED TIE RODS

This is a national stage of PCT/HR11/000017 filed May 10, 2011 and published in English, which has a priority of Croatia no. P 20100267 A filed May 13, 2010, hereby incorporated by reference.

DESCRIPTION OF THE INVENTION

1. Technical Fields

This invention relates to an In-line Pressure Balanced Expansion Joint for compensation of thermal dilatation of piping and ducting of circular cross section with connecting elements located inside the device. Placing of connecting elements within the device does not disturb the fluid flow through the device and the device becomes compact and suitable for different applications.

According to the seventh edition of the International Patent Classification invention belongs to the following areas of technology:

F16L51/00—Devices for compensating of pipe dilatations,

F16L51/03—Devices for compensating of pipe dilatations using bellow or extended corrugated tube with two bellows or more, F16L27/12—Longitudinally adjustable or movable pipe joints.

2. Technical Problems

In-line pressure balanced expansion joint for thermal expansion compensation represents one of the major solutions for the protection of rotating machinery such as turbines, pumps and compressors from the impact of high pressure unbalanced force that occur by installing compensating devices in the piping or ducting system.

In-line pressure balanced expansion joint for thermal expansion compensation consists three expansion joints made of bellows inserted in the piping or ducting system in order to takeover thermal shrinkage or expansion of connecting piping. Their usual design is such that the two sideways expansion joints are located on the outer diameter of the cylindrical casing whose outer diameters are equal to the diameter of the connecting pipe and the central expansion joint located at the cylindrical casing of larger diameter than the diameter of connecting piping and a cross-sectional area twice greater than the sideways expansion joints.

In In-line pressure balanced expansion joint, which consists of three expansion joints, housing of expansion joints are connected with connecting elements that play multiple roles. Equalization of dilatation displacement between individual expansion joints, the transfer of tensile or compressive unbalanced forces caused by overpressure or vacuum and stiffening of the device is performed through the connecting elements so called tie rods.

The problem of interconnection of individual expansion joints in series is particularly pronounced in the compensation device for piping or ducting system of circular cross section with a diameter greater than 2 meters. At compensating device for piping with a diameter greater than 2 meters the outer diameters of the central expansion joint housing is significantly increased and there is additional problem of central expansion joint housing stiffness. The problem of the large central expansion joint housing deformation is solved by installing various bracing.

Connecting elements and case bracing for the large compensating devices should be designed not to disrupt the flow of fluid through the device and not to increase the already large dimensions of the device. Properly placed connection elements and bracing prevent any deformation of expansion joints housing in a series and the whole expansion joint system, ensuring proper stretching or compression of bellows in a series only due to thermal expansion and not due to excess pressure or vacuum that exists in the piping or ducting.

According to the invention In-line pressure balanced expansion joint for compensating thermal dilatation solves the technical problems of design and placing of connecting elements which are used to interconnect individual expansion joints in the device, and solves design and placing of casing bracings for individual expansion joints in the device.

BACKGROUND ART

Known devices for compensation basically consist of a one large, central expansion joint and two mirror-symmetrical, smaller side expansion joints that are through the casing and connecting elements bind with the central. Bellows of sideways expansion joints have cylindrical housing diameter approximately equal to the diameter of the piping or ducting, while the diameter of the cylindrical casing of the central expansion joint bellow is greater than the diameter of piping or ducting on which the device is connected.

In contemporary practice, two kinds of solutions related to the installation of connecting elements are represented. In the first kind of solution connecting elements are placed inside the device in the area of fluid flow with diameter that is smaller than the inner diameter of piping. For other types of solutions, especially for devices with relatively small diameters, connecting elements are located outside the unit.

The solutions of In-line pressure balanced expansion joint for compensation of thermal dilatation with the binding elements located outside the unit are described in patent document U.S. Pat. No. 5,299,840, U.S. Pat. No. 5,248,170, BE544576 and FR1146661.

In the patent document CN2215063Y is described a solution for In-line pressure balanced expansion joint for compensation of thermal dilatation without connecting elements.

The Essence of the Invention

According to the invention the basic structure of the device for compensation of thermal dilatations of piping and ducting is equal to the known structure of the compensating devices, expansion joints. Device for compensation according to the invention basically consists of one large, central expansion joint and two mirror-symmetrical, smaller side expansion joints that are through the casings and connecting elements connected with the central.

The essence of the invention is contained in the design of the sideways expansion joints casings and the casing of the central expansion joint, place and manner of installation of connecting elements that connect the sideways expansion joints with the central expansion joint, and design of bracing the sides of the central expansion joint casing.

Each of the two sideway expansion joints consists of a bellows whose inner diameter is greater than the outer diameter of piping or ducting that connects the device for compensation. At the end of bellows welded pipe spools are welded and that are welded to the sides of the side expansion joint. Outer sides of sideway expansion joints have form of annular plate on which outer edges are welded spools of the bellows and on the inner edges of the pipe are welded spools to connect the device for compensation to the piping or ducting. The outer diameter of the external sides of sideway expansion joints is equal to the inner diameter of the bellows of sideway expansion joints and the inner diameter of the external sides of sideway expansion joint is equal to the outer diameter of the piping or ducting that connects the compensation device. The inner sides of sideway expansion joint consists of the sides of the central expansion joint on which are centrally welded inner pipe spools of side expansion joints.

Central expansion joint consists of a bellow whose inner diameter is greater than the inner diameter of sideway expansion joint bellows. At the ends of corrugated pipe of the central expansion joint pipe spools are welded and that are welded to the sides of the central expansion joint. Sides of the center expansion joint have form of annular plates whose outer edges are welded to pipe spools of central expansion joint bellow. The outer diameter of the sides of the central expansion joint is equal to the inner diameter of the bellow of central expansion joint and the inner diameter of the sides of the central expansion joint is equal to the outer diameter of the piping or ducting that connects the compensation device. On the inner surfaces of the central expansion joint sides reinforcements were made to the sides of the central expansion joint. Within an internal diameter of the sides of the central expansion joint reinforcements with reinforced ring that have cross section of hollow rectangle and are further reinforced with the rectangular radial fins within, were made. Outside the ring reinforcements, bellows rectangular radial fins triangular reinforcements in the form of radial ribs are made.

In the annular space which is defined with outer sides of the side expansion joints are bonding elements that interconnect casings of all three compensators. On a circle whose diameter is greater than the outer diameter of a piping or ducting and less than the inner diameter of side expansion joint bellows there are longitudinal connective elements at equal angular intervals which have the form of the full beam with circular cross section. Left side expansion joint is connected to a central expansion joint using tie rods so that their left ends are tightly welded to the left side of the left side expansion joint and their right ends are tightly welded to the right side of the central expansion joint. Right side expansion joint is connected to a central expansion joint using tie rods so that their right edges are tightly welded to the right sides of the right side expansion joint and their left ends are tightly welded to the left side of the central expansion joint. Penetrations in the surfaces and reinforcements through which tie rods breach have a diameter larger than the diameter of rods passing through them so that between tie beams and these components there is no contact at all. Tie rods on the left side of the expansion joint in relation to the tie rods on its right side are displaced for the half of angle that tie rods are spaced on each side of the device.

Properly placed retention and bracing prevent any deformation of individual cases in a series of expansion joints and the expansion joint system, ensuring proper stretching or shrinking of bellows in a series only due to thermal expansion and not due to excess pressure or vacuum that exists in the piping or ducting.

According to the invention design of expansion joint in which the tie rods are located in the annular space that is determined by the outer sides of the sideway expansion joints in relation to the solutions described in the technical condition has many advantages. Tie rods of this device does not obstruct fluid flow through the device as tie rods of device in which these elements are placed in the space through which the fluid flows. Tie rods of this device does not increase the dimensions of the device as tie rods of device in which these elements are located outside the device with larger diameter than the outer diameter of bellow of the central expansion joint. Therefore, according to the invention the solution enables the production of the expansion joint for piping and ducting of large diameters above 2 meters.

DESCRIPTION OF THE DRAWINGS

According to the invention

According to the invention

DESCRIPTION AND APPLICATION PERFORMANCE

Figure 1:
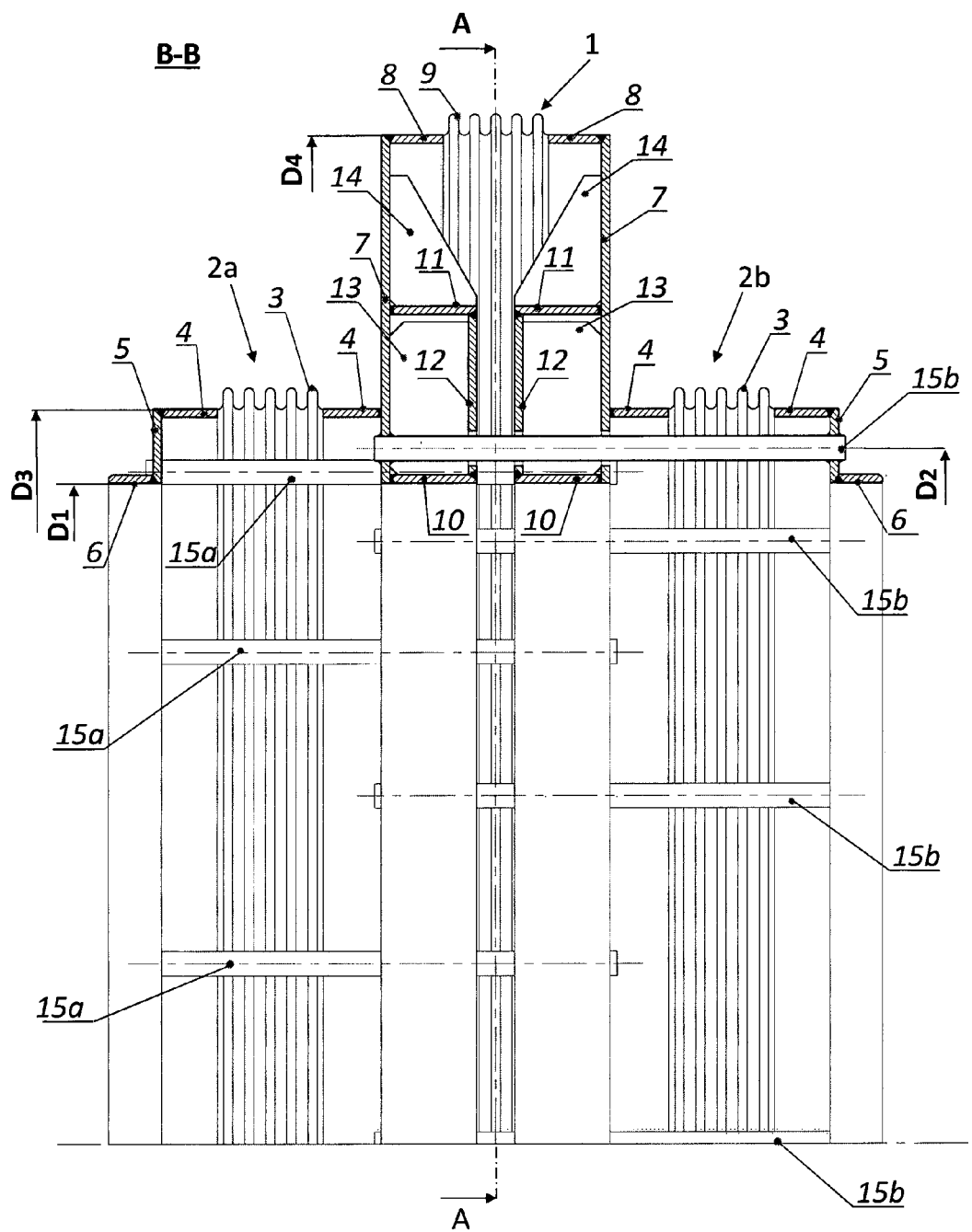
FIG. 1 shows the typical cross-section B-B from the FIG. 2 with radial plane symmetry of the upper half of the in-line pressure balanced expansion joint for thermal expansion compensation.
Figure 2:
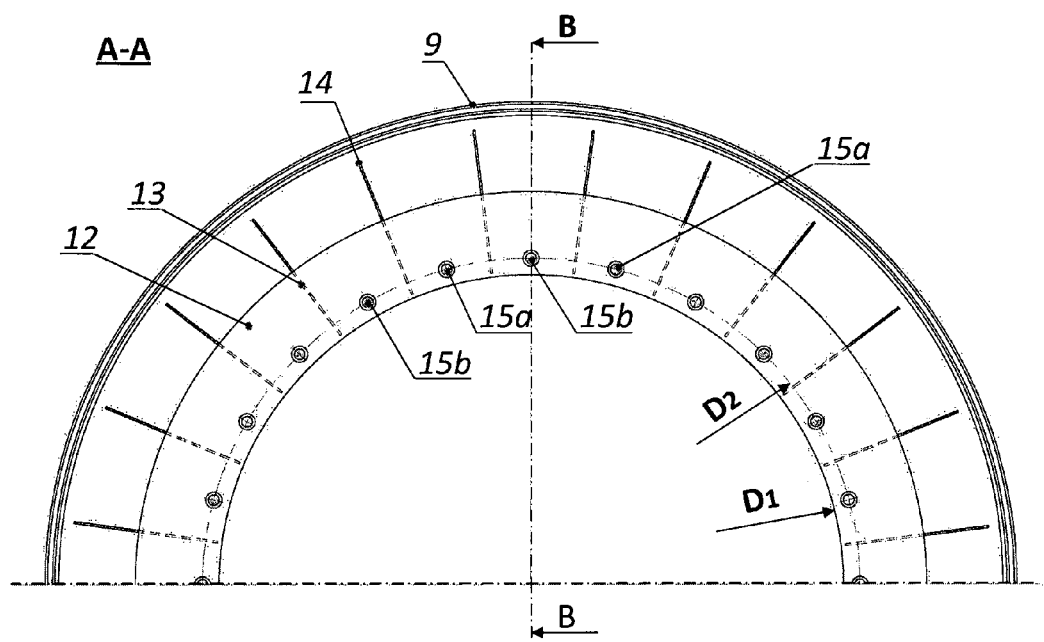
FIG. 2 shows the A-A cross-section from the FIG. 1 with a symmetry plane perpendicular to the longitudinal axis of the upper half of the in-line pressure balanced expansion joint for thermal expansion compensation.

In-line pressure balanced expansion joint for thermal expansion compensation of piping and ducting with circular cross section and the connecting elements located inside the device is shown in FIGS. 1 and 2 consists of one large, central expansion joint 1 and two, mirror-symmetrical, smaller side expansion joints. Left sideway expansion joint 2a and right sideway expansion joint 2b, are connected via the casing and tie rods with the central expansion joint 1.

Left sideway expansion joint 2a and right sideway expansion joint 2b, consist of bellows 3 which inner diameter D3 is greater than the outer diameter of piping or ducting D1 on which expansion joint is connected. At the end of bellow 3 are tightly welded pipe spools 4 that are tightly welded to the sides of the sideway expansion joint 2a and 2b. The outer pipe spools 4 are tightly welded to the outer edges of the external sides 5 of sideway expansion joint 2a and 2b. Sides 5 have the form of annular plate on which outside of inner edges is tightly welded pipe spool 6 for connecting the expansion joint to the piping or ducting. The outer diameter D3 of external sides 5 is equal to the inner diameter of the bellow 3 of sideway expansion joints 2a and 2b and the inner diameter D1 of external sides 5 is equal to the outer diameter of the piping or ducting that expansion joint is connected. Inner pipe fittings 4 of sideway expansion joints 2a and 2b are tightly centric welded to the sides 7 of the central expansion joint 1.

Central expansion joint 1 consists of the sides 7 with stiffeners, pipe spools 8 and the bellow 9. The inner diameter D4 of bellow 9 is greater than the internal diameter D3 of bellows 3 of sideway expansion joints 2a and 2b. If we want to achieve a complete balance of forces, inner diameter D4 of bellow 9 and the inner diameter D3 of bellow 3 for sideway expansion joints 2a and 2b should be in the following well-known relation:

$$D_4^2 = 2D_3^2.$$

Diameter of bellows should be in this relation because the cross-sectional area of the central expansion joint 1 bellow 9 must be equal to the sum of cross sectional area of bellows 3 of sideway expansion joints 2a and 2b. In this way, the pressure forces in the individual expansion joints are in balance and there is no residual force that would burden any reliance on the piping or ducting system or any other piece of equipment. If it does not satisfy the above relation then there is remain of a force that is not in balance and it burdens reliance or any other piece of equipment. At the ends of bellow 9 of the central expansion joint 1 pipe spools 8 are tightly welded, which are on the other hand tightly welded to the outer edges of the surface side 7. Sides of the central expansion joint 1 are shaped like annular plate with an outer diameter equal to the inner diameter D4 of bellows 9 of the central expansion joint 1 and the inner diameter D1 is equal to the outside diameter of piping or ducting that expansion joint is connected to.

Due to the considerable compressive forces that act on the increased internal surfaces of the central expansion joint 1 at the inner surfaces of sidewalls 7 are derived reinforcements that are mutual mirror symmetric. Within the inner diameter D1 of sides surfaces 7 of central expansion joint 1 there are derived mirror symmetric ring reinforcements that have section view of a hollow rectangular shape. Ring reinforcements consist of concentric cylinders 10 and 11, which are welded to the inner surfaces of the side surfaces 7 and which are closed with annular plates 12. Ring reinforcements have been further strengthened from the inside, with welded rectangular radial ribs 13, at equal angular intervals. Outside the ring reinforcements, below radial ribs 13, welded reinforcements are made in the form of triangular radial ribs 14.

In the annular space that is defined with outer sides 5 of the sideway expansion joint 2a and 2b are longitudinal tie rods that have a form of full circular beams which are used to connect three expansion joints casings. On a circle whose diameter D2 which is larger than the outer diameter D1 of piping or ducting and smaller than the internal diameter D3 of bellows 3 of sideway expansion joints 2a and 2b are tie rods 15a and 15b at the same angular intervals. Left sideway expansion joint 2a and the right sideway expansion joint 2b are connected to a central expansion joint 1 using tie rods 15a so that their left ends are tightly welded to the left side surface 5 of the left side expansion joint 2a and their right ends are tightly welded to the right side surface 7, which is common to the central expansion joint 1 and right sideway expansion joint 2b. The right sideway expansion joint 2b is connected to a central expansion joint 1 and left sideway expansion joint 2a using tie beams 15b so their right ends are tightly welded to the right side surface 5 of the right sideway expansion joint 2b and their left ends are tightly welded to the left side surface 7, which is common to the central expansion joint 1 and left side expansion joint 2a. Penetrations in the side surfaces 7 and annular plate 12 through which tie rods 15a and 15b breach, have a diameter larger than the diameter of the tie beam so that the tie beams 15a and 15b and these parts do not have any contact during use. Tie rods 15a on the left sideway of the expansion joint in relation to the tie rods 15b on its right side are displaced by half of the angle that the tie rods are spaced on each side of the device. Such retention setup ensures the equalization of dilatations shifts between individual expansion joints, transfer of pressure or tensile forces and stiffening of the device.

Because of its compactness and functionality described design allows you to create expansion joints for thermal expansion for all types of piping and ducting and it is particularly suitable for making expansion joints for piping and ducting with a diameter greater than 2 meters. Applied structural properties based on the described design are possible in other versions while characteristics that make up the essence of the invention do not deviate.

The invention claimed is:

1. An in-line pressure balanced expansion joint for compensation of thermal expansion of piping and ducting of circular cross section with tie rods located inside the joint, which comprises one large, central expansion joint with stiffeners, a left sided expansion joint and a right sided expansion joint which are interconnected through respective casings and via the tie rods, characterized in that, the left sided expansion joint and right sided expansion joint comprise respective bellows whose inner diameter D3 is greater than the outer diameter D1 of the piping or ducting and on whose outer ends are tightly welded outer pipe spools that are tightly welded to the outer edges of external sides, which have the form of annular plates whose outer diameter is equal to bellows inner diameter D3 and whose inner diameter is equal to the outer diameter D1 of the piping or ducting, on the inner edges of the external sides, on the outside, are tightly welded further pipe spools for connecting the expansion joint to the piping or ducting, and on the inner ends of the left and rights sided bellows are tightly welded inner pipe spools that are tightly centric welded to the sides of the central expansion joint which comprises a bellows whose inner diameter D4 is greater than the inner diameter D3 of the left and rights sided bellows and whose ends are tightly welded to vet further pipe spools which are on the other hand tightly welded to the outer edges of the sides that have the form of annular plates whose outer diameter equals the inner diameter D4 of the central bellows and whose inner diameter is equal to the outer diameter D1 of the piping or ducting, whereby the tie rods do not obstruct fluid flow in the expansion joint.

2. The in-line pressure balanced expansion joint for compensation of thermal expansion of piping and ducting of circular cross section with tie rods located inside the joint according to claim 1, characterized that, on the inner surfaces of the sides are arranged mirror symmetric ring reinforcement composed of cylinders whose inner diameter is equal to the outer diameter D1 of the piping or ducting and concentric cylinders of larger diameter which are welded to the inner surfaces of the sides and on their ends are welded inner ring plates, which are from the inside, on the same angular intervals, reinforced with welded rectangular radial ribs and from the outside, in the extension of radial ribs, with welded triangular radial ribs.

3. The in-line pressure balanced expansion joint for thermal expansion compensation of piping and ducting of circular cross section with tie rods located inside the joint according to claim 1, characterized that, in the annular space that is determined by the outer sides of left side expansion joint and outer sides of right side expansion joint on a circle diameter D2 that is larger than the outer diameter D1 of the piping or ducting and smaller than the internal diameter D3 of let and right sided bellows at equal angular intervals, are placed bonding elements that have the form of longitudinal left and right sided tie rods with circular cross section which are connecting the three expansion joint casings so that the left end of the left sided tie rods is tightly welded to the left side of left side expansion joint and their right ends tightly welded to the right side of the central expansion joint, and the right end of the right sided tie rods tightly welded to the right side of right side expansion joint and their left end tightly welded to the left side of the central expansion joint, and the penetrations in the sides and in annular plates through which the tie rods breach have a diameter larger than the diameter of the rods, and tie rods on the left side of the expansion joint in relation to the tie rods on its right side are displaced by half of the angle that the tie rods are spaced on each side of the device.

4. The in-line pressure balanced expansion joint for thermal expansion compensation of piping and ducting of circular cross section with tie rods located inside the joint according to claim 1, characterized that it is used for making expansion joints for thermal expansion of piping and ducting with a diameter greater than 2 meters.

5. An in-line pressure balanced expansion joint for compensation of thermal expansion of piping and ducting of circular cross section having an outer diameter, comprising:

a central expansion joint, a left expansion joint and a right expansion joint, the left expansion joint and right expansion joint, each having an annular plate having an inner diameter and an outer diameter, the annular plate inner diameter having a pipe spool extending outwardly therefrom and the annular plate outer diameter having a bellows extending inwardly therefrom, the annular plates having an outer diameter equal to an inner diameter of the bellows and an inner diameter equal to the outer diameter of the piping or ducting, the bellows having an inner diameter which is greater than the outer diameter of the piping or ducting and having inwardly extending inner pipe spools;

the central expansion joint having a bellows having an inner diameter which is greater than the inner diameter of the bellows of the left and right expansion joints, and at each end thereof having pipe spools and a left side and a right side in the form of annular plates having an outer diameter equal to the inner diameter of the central expansion joint bellows and an inner diameter is equal to the outer diameter of the piping or ducting;

a plurality of tie rods extending inwardly from the left expansion joint and right expansion joint annular plates through penetrations in the central expansion joint sides, whereby the tie rods do not obstruct fluid flow in the expansion joint.

6. The in-line pressure balanced expansion joint of claim 5, the central expansion joint further comprising two concentric cylinders, one cylinder whose inner diameter is equal to the outer diameter of the piping or ducting and another cylinder of larger diameter, the cylinders extending from the central expansion joint sides.

7. The in-line pressure balanced expansion joint of claim 6, the central expansion joint further comprising radial ribs extending inwardly from the central expansion joint sides.

8. The in-line pressure balanced expansion joint of claim 5, wherein the tie rods are positioned in an annular space extending between the outer diameter of the piping or ducting and the internal diameter of the bellows of the left expansion joint and right expansion joint, with left side tie rods being affixed to the left expansion joint annular plate and the right side of the central expansion joint, and right side tie rods being affixed to the right expansion joint annular plate the left side of the central expansion joint.

9. The in-line pressure balanced expansion joint of claim 8, where the left side tie rods and the right side tie rods are alternately and evenly distributed around the central expansion joint.

10. The in-line pressure balanced expansion joint of claim 8, wherein the left expansion joint and right expansion joint annular plates have an inner diameter greater than 2 meters.

\* \* \* \* \*